(12) United States Patent
Brownell

(10) Patent No.: US 7,437,319 B2
(45) Date of Patent: Oct. 14, 2008

(54) METHOD FOR ON-LINE PARTS ORDERING

(76) Inventor: Peter R. Brownell, 1514 Main St., Grinnell, IA (US) 50110

( * ) Notice: Subject to any disclaimer, the term of this patent is extended or adjusted under 35 U.S.C. 154(b) by 737 days.

(21) Appl. No.: 10/752,879

(22) Filed: Jan. 6, 2004

(65) Prior Publication Data
US 2005/0246236 A1 Nov. 3, 2005

(51) Int. Cl.
G06F 17/30 (2006.01)
(52) U.S. Cl. .............................. 705/27; 705/26; 705/29
(58) Field of Classification Search .................. 705/26, 705/27, 29
See application file for complete search history.

(56) References Cited

U.S. PATENT DOCUMENTS

| 5,970,475 A | 10/1999 | Barnes et al. | |
|---|---|---|---|
| 6,486,439 B1 | 11/2002 | Spear et al. | |
| 2001/0027429 A1 | 10/2001 | Uemura | |
| 2001/0042030 A1 | 11/2001 | Ito et al. | |
| 2002/0038262 A1* | 3/2002 | Fukuda et al. | 705/27 |
| 2002/0082953 A1 | 6/2002 | Batham et al. | |
| 2002/0184111 A1 | 12/2002 | Swanson | |
| 2003/0046184 A1 | 3/2003 | Bjorklund et al. | |
| 2003/0055748 A1 | 3/2003 | Bezrukov et al. | |
| 2003/0130911 A1* | 7/2003 | Wong | 705/27 |

\* cited by examiner

Primary Examiner—Vanel Frenel
(74) Attorney, Agent, or Firm—McKee, Voorhees & Sease, P.L.C.

(57) ABSTRACT

The present invention is a method of selling replacement parts for a product over a computer network including providing a plurality of product manufacturer selection options for a customer to select from, receiving a manufacturer selection of one of the product manufacturers, providing a plurality of product selections for the customer to select from, receiving a product selection of one of the products, providing a schematic illustrating a plurality of component parts of the product with associated reference identifiers, receiving a selection of at least one of the component parts, providing a description of the component part selected, including at least one name for the component part and at least one part number for the component part.

21 Claims, 6 Drawing Sheets

| REF # | FACTORY PART # PREVIOUS # | STOCK NUMBER | PRODUCT | PRICE | QTY | | |
|---|---|---|---|---|---|---|---|
| 1 | B3474730 P074730 | 149-001-151 | BREECH BLOCK FITS | $86.66 | 1 | BUY | FAV FFL-REC |
| 4 | B3474742 P074742 | 149-001-152 | DEFLECTOR FITS | $9.90 | 1 | BUY | FAV |
| 5 | B3474744 P074744 | 149-001-153 | DEFLECTOR BALL FITS | $3.16 | 1 | BUY | FAV FFL-REC |
| 6 | B3474746 P074746 | 149-001-154 | DEFLECTOR BALL SPRING FITS | $3.16 | 1 | BUY | FAV |
| 7 | B3474750 P074750 | 149-001-156 | EJECTOR CONNECTING PIN FITS | $3.90 | 1 | BUY | FAV FFL-REC |
| 8 | B3474753 P074753 | 149-001-157 | EJECTOR HAMMER FITS | $25.58 | 1 | BUY | FAV |
| 9 | B3474756 P074756 | 149-001-158 | EJECTOR HAMMER EXTENTION FITS | $12.93 | 1 | BUY | FAV |

Fig. 5

| | | | | | | |
|---|---|---|---|---|---|---|
| 82 | B3474933<br>P074933 | 149-001-236 | TRIGGER HOUSING FITS | $45.30 | 1 | BUY FAV FFL-REC |
| 83 | B3474938<br>P074938 | 149-001-238 | TRIGGER HOUSING PIN FITS | $5.00 | 1 | BUY FAV |
| 84 | B3474907<br>P074907 | 149-001-229 | TRIGGER/SEAR PIN FITS | $3.75 | 1 | BUY FAV |
| 86 | B3474908<br>P074908 | 149-001-231 | TRIGGER SEAR FITS | $21.39 | 1 | BUY FAV FFL-REC |
| 87 | B3474909<br>P074909 | 149-001-233 | TRIGGER SEAR PIN FITS | $2.58 | 1 | BUY FAV |
| 88 | B3474912<br>P074912 | 149-001-234 | TRIGGER SPRING FITS | $3.95 | 1 | BUY FAV FFL-REC |

202 { THE FOLLOWING FACTORY PART NUMBERS ARE FACTORY RESTRICTED (R) AND NOT AVAILABLE.
R   B3474723   #89 BARREL/RECEIVER

204 { THE FOLLOWING FACTORY PART NUMBERS ARE NOT AVAILABLE (N/A).
N/A   #90 BUTT PLATE
N/A   #91 BUTT PLATE SCREWS

*Fig. 6*

METHOD FOR ON-LINE PARTS ORDERING

BACKGROUND OF THE INVENTION

The present invention is related to on-line ordering of component parts, and in particular to the on-line ordering of component parts for guns from a supplier.

Gun owners have always had difficulties in replacing parts in their guns. Guns are often complex mechanical devices with a great number of small and specialized parts. Although there are some basic similarities between guns of all makes and all models, many of these small and specialized parts are unique to a particular gun, make or model, making them difficult to identify by name or function. In addition, none of these parts have part numbers on them, so identification of a part is by memory, by review of factory books which are often out of date, or by contacting someone who might know. Thus, gun owners have always had difficulties in obtaining replacement parts.

Even experienced gunsmiths also have encountered difficulties in the ordering of parts. A gunsmith may have a gun part that needs replacing, but still cannot identify the part because a part number is not placed on the part. Thus, a gunsmith would still need to answer the question of "What is this part in my hand?" To do so, a gunsmith would typically place a call to a mail order gun supplier. If the gun supplier is closed, the gunsmith might not call back or might not order. The gunsmith who needs to get the job done would likely find an answer to their question no matter what.

It is further noted that customers, particularly retail customers have difficulties going directly to a gun factory to obtain replacement parts. Gun factories typically do not want to deal directly with retail customers. Therefore, the response time, payment policies, and shipping policies for gun factories are not generally conducive to serving the retail customer, and typically discourage contacts directly with retail customers. What is needed is a convenient method for ordering of gun parts.

Therefore, it is a primary object, feature, or advantage of the present invention to provide a method for on-line ordering of parts.

Another object, feature or advantage of the present invention is to provide a convenient and intuitive method that allows customers to identify and order gun parts.

Yet another object, feature and advantage of the present invention is to provide a method for customers to order gun parts without knowing proper part names or model numbers.

A still further object, feature and advantage of the present invention is to provide a method that allows for ordering of restricted gun parts to authorized customers.

It is a further object, feature, or advantage of the present invention to provide a potential customer with the ability to order parts on-line 24 hours a day.

These and/or other objects, features, or advantages of the present invention become apparent from the specification and claims that follow.

SUMMARY OF THE INVENTION

The present invention provides for a method of selling replacement parts for products over a computer network. Using the methodology of the present invention a customer can conveniently identify and order replacement parts for a product such as a gun or other firearm product. In one embodiment, the method includes a step of providing a plurality of product manufacturer selection options for customers to select from and then receiving a manufacturer selection from one of the product manufacturers. The next step is providing a plurality of part selections for the customer to select from and then receiving a product selection of one of the products. The method provides a schematic illustrating a plurality of component parts of the product with associated reference identifiers and receiving a selection of at least one of the component parts. The method also includes providing a description of component parts selected, including at least one name for the component part and at least one part number for the component part.

The present invention also includes a method of ordering parts for a gun. According to the method, a customer visits a web site associated with a gun supplier. The customer also identifies a physical gun part to be placed. The physical gun part is not labeled with an identifying part number, but has a known manufacturer and a known model number. The customer selects the known manufacturer and the known model number from the web site. The customer then receives from the web site a schematic of the gun. The customer compares the physical gun part to be replaced to the schematic of the gun in order to match the physical gun part with a gun part illustrated within the schematic. The customer then selects a link on the schematic to receive an associated description of the selected gun part. The customer can then select a link to initiate an ordering process to order a replacement gun part matching the physical gun part.

BRIEF DESCRIPTION OF THE DRAWINGS

FIG. 5 is one embodiment of a screen display of the present invention showing information about particular parts.

FIG. 6 is one embodiment of a screen display of the present invention showing that certain parts are factory restricted or not available.

DETAILED DESCRIPTION OF THE PREFERRED EMBODIMENT

The present invention is now described in a preferred embodiment. The present invention is not limited to the specific embodiment described herein. Instead, the invention should only be limited by the full scope of the invention as claimed and any equivalents thereto.

Figure 1:
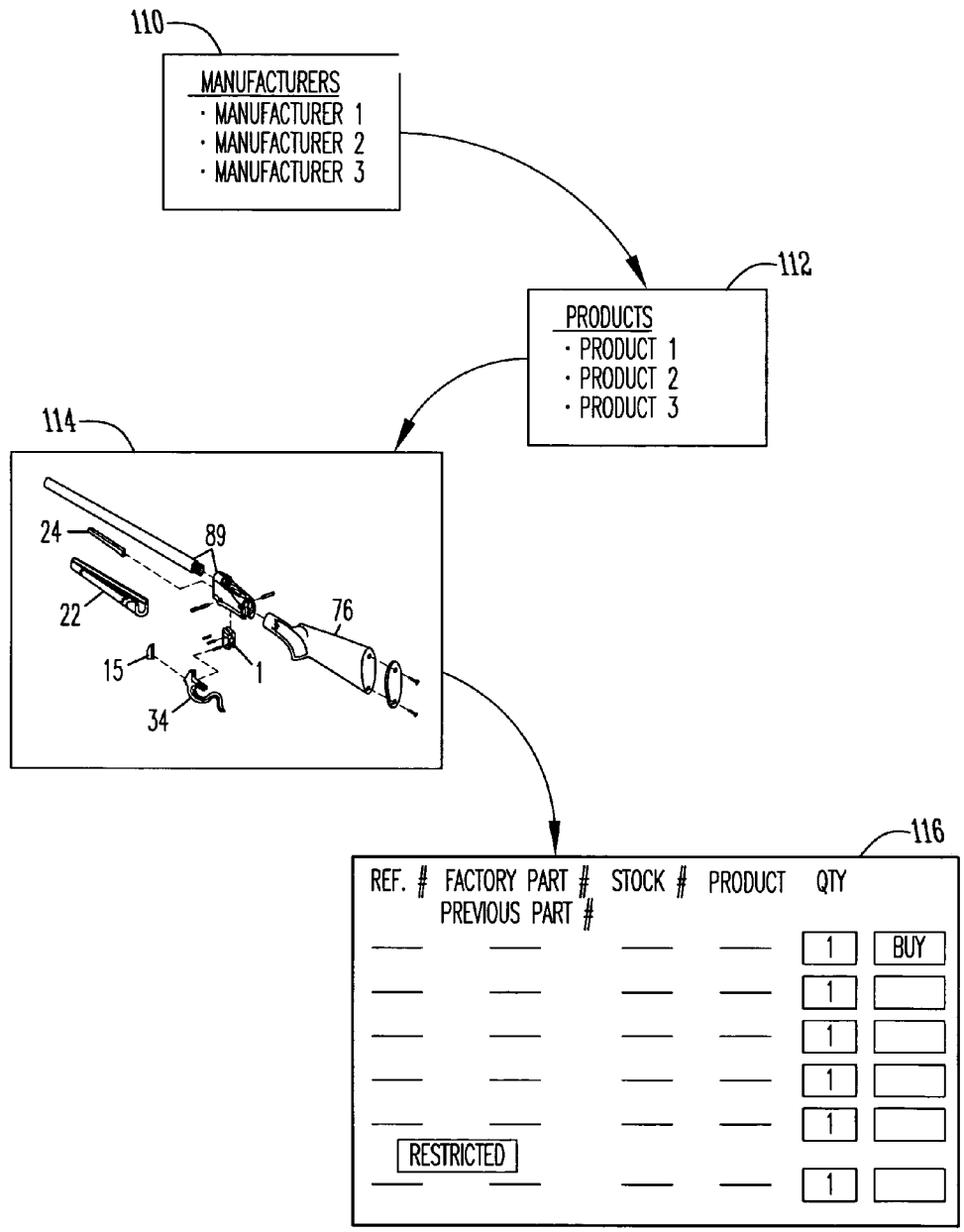
FIG. 1 is an overview of the methodology according to one embodiment of the present invention.

In FIG. 1, an overview of one embodiment of the methodology of the present invention is shown. In step 110, a list of manufacturers of different products is provided so that a customer or other user can select one of the manufacturers in step 110 associated with a particular component or gun part. In step 112, a screen display providing selection options for a customer to select a product or model associated with the manufacturer or make is displayed. Once the product is selected in step 112, then in step 114, the schematic for the product is displayed. The schematic includes a plurality of component parts. The component parts can be identified with a reference identifier such as a reference number. The customer can select these reference numbers. Once one of the reference numbers is selected, then in step 116 information concerning that part is provided. Information can include the reference number, one or more part numbers, including the factory part number and previous factory part numbers, a stock number, and a product name or product description. A quantity of product to order for each product and a buy button can also be present. The present invention also contemplates that the reference identifiers are in numeric or alpha numeric order. In a preferred embodiment, the names of the components are alphabetized and then referenced identifiers are assigned. The present invention also contemplates that in step 116 there is an indication that the part is a factory restricted part which is not available to order by all persons. For example, the part may only be orderable by a police officer or certain government officials.

Figure 2:
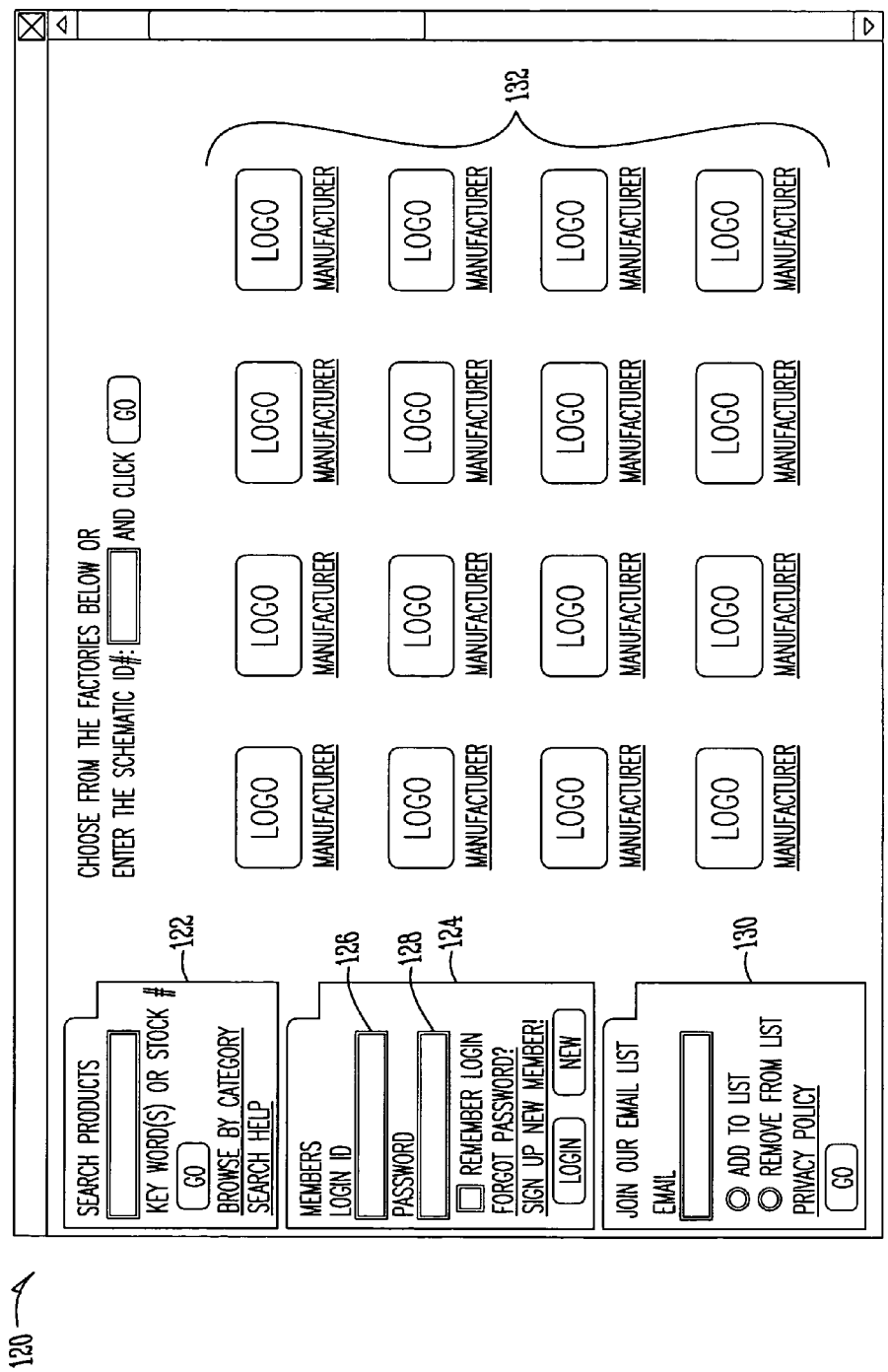
FIG. 2 is one embodiment of a screen display for selecting a manufacturer.

FIG. 2 illustrates a screen display 120 for selecting a manufacturer. The present invention contemplates that in addition to providing a plurality of manufacturer selections, a web page such as screen display 120 includes an area 122 that allows a customer to search products. An area 124 allows member customers to login by entering a login ID 126 and a password 128. The login feature of the present invention can be used to authorize ordering of restricted parts or verifying that the restricted parts can be order. In addition, there is an area 130 that allows a customer to join an email list by entering their email address.

A plurality of manufacturer 132 are displayed. The names and/or logos for each of the manufacturers can be displayed with a link to product-related web pages for each specific manufacturer. The present invention contemplates links of various kinds, including hypertext links, image maps, links implemented through scripting and other implementations.

Figure 3:
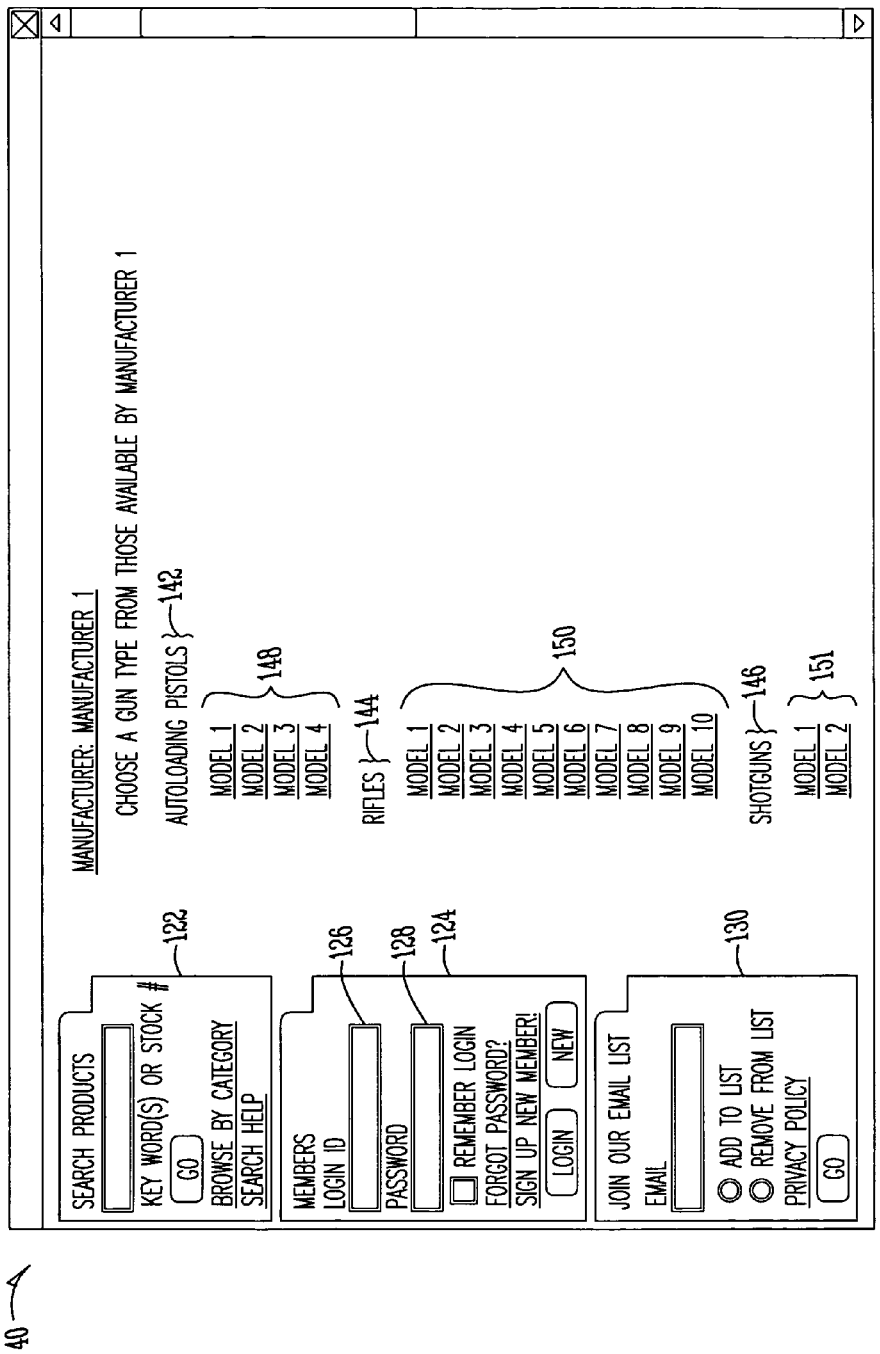
FIG. 3 is one embodiment of a screen display for selecting a product from a manufacturer.

FIG. 3 illustrates a screen display 40. In the screen display 40, a plurality of product selections are shown. Products shown are various guns. There are multiple product categories including an auto loading pistol category 142, a rifle category 144, and a shotgun category 146. Within each category there are various product selections. The product selections can be selected through hypertext links, scripts, or other implementations. For example, under the auto loading pistol category 142 there are a plurality of auto loading pistol products 148. Similarly, under the rifle category 144, there are a plurality 150 of rifle products.

Figure 4:
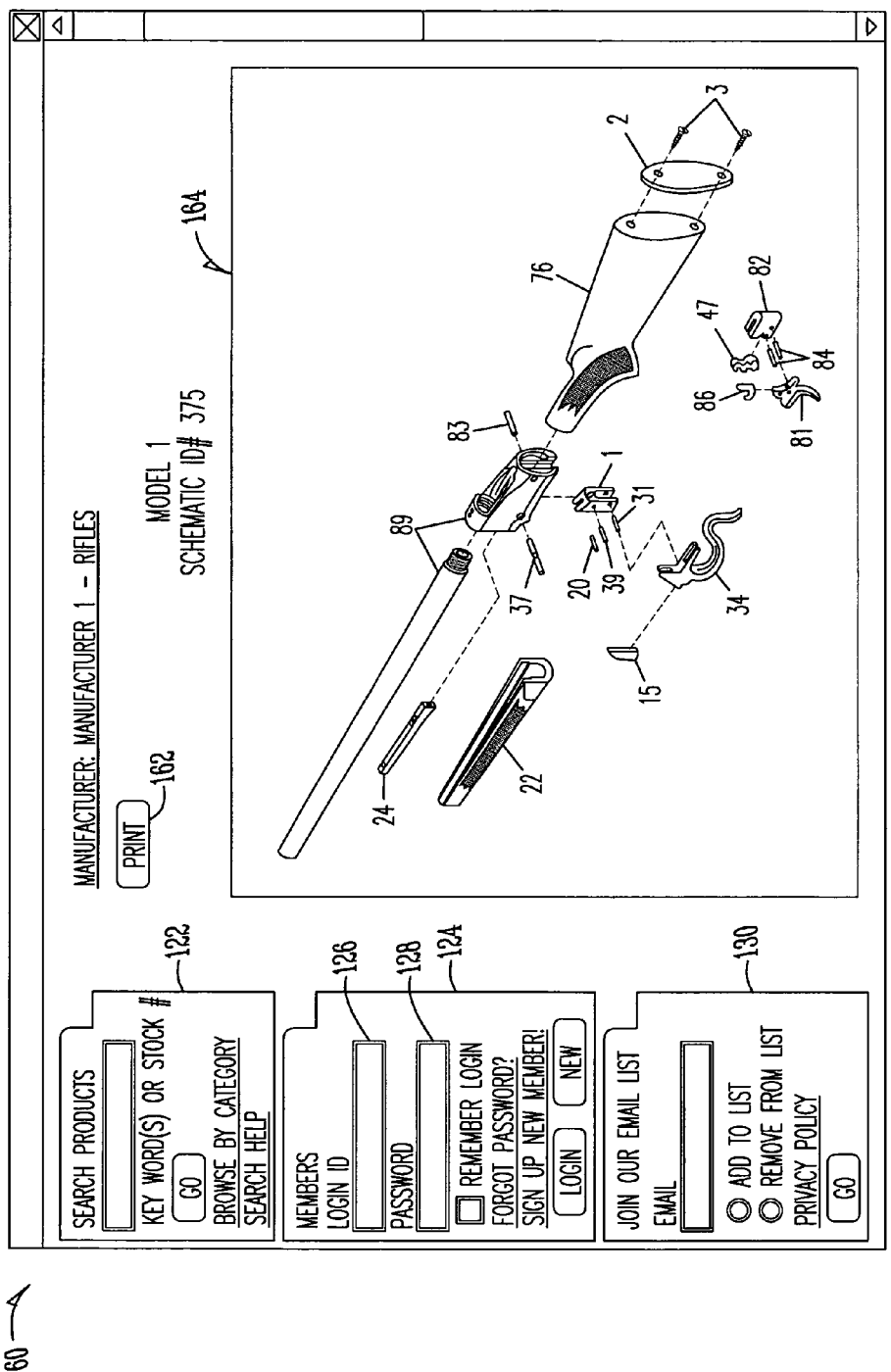
FIG. 4 is one embodiment of a screen display showing a schematic according to the present invention.

FIG. 4 illustrates a web page 60. The web page 60 includes a schematic 164 for a previously selected product. The schematic includes a plurality of parts which are identified with a reference identifier such as a reference numeral. The schematic can be printed by selecting the print button 162. Thus, a user can print the schematic 164 if need be to help identify parts and the parts corresponding reference identifier. In a preferred embodiment the parts of the product are identified with reference numerals that are ordered by the alphabetical order of the corresponding part names. If schematics are obtained from manufacturers, the schematics will need to be scanned or otherwise put in a digital form and the schematic will be numbered or renumbered. Permission from the manufacturers should also be obtained.

In FIG. 5, a web page 180 is shown. The web page 180 lists information about various parts associated with a gun product. The description 181 can include the reference identifier 182, part number 184, a product name or description 186, a price associated with the component part 188, and a quantity of component parts 190 to be ordered. A buyer can change the quantity of a partial or part being ordered. The part number 184 preferably includes current factory part numbers as well as previous factory part numbers. This is advantageous as factories in the industry will renumber parts which can create great confusion as to what the proper part number for a particular component part is. In addition to these current and previous factory part numbers, a stock number can also be given that is used by the supplier. A buy button 192 is placed next to each component part so that a customer can quickly and easily order a particular part. In addition, a favorite button 194 is also conveniently placed so that a registered customer can associate a particular component part with a listing of favorites to provide easier accessibility. Also, there is a column 196 for providing more information about a particular component part as may be needed in a particular instance.

FIG. 6 illustrates another screen display 200. The web page shown in 200 can be the same web page shown in FIG. 5 but merely scrolled to the bottom of the web page. It should be noted that in FIGS. 5 and 6, the products are organized based on their reference identifiers. Their reference identifiers are also alphabetically ordered by the corresponding component part name.

As shown in FIG. 6, for each component part product there is also a link typically entitled "FITS" that links to a web page illustrating the gun products that the component part can be used in. This link can be useful in a variety of circumstances and provide another convenient mechanism for buyers to find the parts they need.

The present invention also provides for situations that occur when particular parts are not available to the general buying public. For example, area 202 lists component parts that are factory restricted and therefore typically not available. The present invention contemplates, however, that through proper security and authorization procedures, one who is qualified to buy factory restricted parts can do so.

In addition, there is an area 204 for a listing of parts that are not available for reasons other than factory restriction. This can include the fact the parts may not be made, such as the factory never intended for such component parts to ever need to be replaced, there is a shortage of parts, or for other reasons.

Thus, it should be apparent that the present in invention provides a method of selling replacement parts for a product over a computer network such as the internet. The method is effectuated by providing a plurality of product manufacture selection options for a customer to select from. Thus, a customer can select a product manufacturer. This manufacturer selection of the part manufacturer is received over the computer network. Upon receipt of the manufacturer selection, the present invention provides a plurality of product selections for the customer to select from. Then, the customer can select one of the products and once the product selection is received, can provide a schematic illustrating the component parts of the product. The component parts have associated reference identifiers, such as reference numerals to identify the part.

The reference identifiers can be hypertext links, or preferably these links are implemented through image maps associated with the reference identifiers or the parts themselves so that the customer can select one or more of these component parts. The present invention contemplates various other means of implementation including scripting. Once a selection of these component parts is received over the network, the description of the component part is provided. This description can include the name of the component part, one or more part numbers of a component part, and other information.

The present invention thus provides a method for a customer or potential customer to order parts for a gun. The customer would need to merely identify the physical gun part to be replaced. The customer would not have to know a particular part number which is important because the physical gun part would not include an identifying part number. The customer only has to know the manufacturer and the model of the gun. The customer then visits a web site associated with a gun supplier. Then, from this web site, the customer selects the known manufacturer from the web site and the known model number from the web site. The customer then receives from the web site a schematic of the gun. The customer then compares the physical gun part to be replaced to the parts shown in the schematic of the gun. The customer then selects a link on the schematic to receive an associated description of the selected gun or part. This information can be used by a customer to increase their knowledge and understanding of the gun parts and also as a verification that they have selected the gun part that they intended to select. Then, the customer selects a link to initiate an ordering process to order a replacement gun part that matches the associated description and matches the physical gun part.

Therefore, methods for on-line ordering of gun parts have been disclosed. The present invention contemplates numerous variations in the web pages themselves, the type of reference identifiers used, the type of links (i.e., hypertext links, image maps, and other types of links) and other variations within the spirit and scope of the invention now claimed.

What is claimed is:

1. A method of selling replacement parts for a product to a customer and over a computer network, comprising:
   providing a plurality of product manufacturer selection options for the customer to select from over the computer network;
   receiving a manufacturer selection of one of the product manufacturers from the customer and over the computer network;
   providing a plurality of product selections for the customer to select from over the computer network;
   receiving a product selection of one of the products from the customer and over the computer network;
   providing over the computer network and to the customer an interactive schematic illustrating a plurality of component parts of the product with associated reference identifiers;
   receiving a selection from the interactive schematic of at least one of the component parts over the computer network.

2. The method of claim 1 further comprising providing a description of the component part selected, including at least one name for the component part and at least one part number for the component part.

3. The method of claim 2 wherein the product is a firearm product.

4. The method of claim 1 wherein the reference identifier is a selectable reference numeral.

5. The method of claim 1 wherein the schematic is an exploded view.

6. The method of claim 1 further comprising receiving an order for the component part from the customer.

7. The method of claim 1 wherein the description includes more than one name associated with the component part.

8. A method of selling replacement gun parts over a computer network, comprising:
   providing a web site for the customer to visit to order a replacement gun part;
   providing on the web site a plurality of gun manufacturer selection options for a customer to select from;
   receiving a manufacturer selection of one of the gun manufacturers over the computer network;
   providing a plurality of gun product selection options for the customer to select from over the computer network;
   receiving a product selection of one of the gun products over the computer network;
   providing over the computer network to the customer an interactive schematic illustrating a plurality of component parts of the gun product with associated reference identifiers; receiving a selection by the customer from the interactive schematic of at least one of the component parts over the computer network.

9. The method of claim 8 further comprising providing a description of the component part selected, including at least one name for the component part and at least one part number for the component part.

10. The method of claim 9 further comprising providing an indication that the component is a restricted component.

11. The method of claim 10 further comprising authorizing ordering of the restricted component.

12. The method of claim 9 further comprising receiving an order for the component part from the customer.

13. The method of claim 9 wherein the description includes more than one name associated with the component part.

14. The method of claim 9 wherein the at least one part number of the description includes at least one manufacturer part number.

15. The method of claim 9 wherein the part number of the description includes more than one manufacturer part number.

16. The method of claim 9 wherein the reference identifier is a selectable reference numeral.

17. The method of claim 9 wherein the schematic is an exploded view of the gun product.

18. The method of claim 9 wherein the reference identifiers are ordered by alphabetical ordering of corresponding names of the component parts.

19. A method of ordering parts for a gun, comprising:
   visiting a web site associated with a gun supplier;
   identifying a physical gun part to be replaced, said physical gun part not including an identifying part number, the gun having a known manufacturer and a known model number;
   selecting the known manufacturer from the web site;
   selecting the known model number from the web site;
   receiving from the web site a schematic of the gun;
   comparing the physical gun pan to be replaced to the schematic of the gun;
   matching the physical gun part with a gun part illustrated within the schematic;
   selecting a link on the schematic to receive an associated description of the selected gun part;
   selecting a link to initiate an ordering process to order a replacement gun part matching the associated description and matching the physical gun part.

20. A method of selling replacement gun parts using a web site, comprising:
   providing the web site for the customer to visit to order a replacement gun part;
   providing on the web site a plurality of gun manufacturer selection, options for the customer to select from;
   receiving a manufacturer selection of one of the gun manufacturers from the customer using the web site;
   providing on the web site a plurality of gun product selection options for the customer using the web site to select from;

receiving a product selection of one of the gun products from the customer using the web site;

providing on the web site an interactive schematic illustrating a plurality of component parts of the gun product;

receiving a customer selection front the interactive schematic, the selection corresponding with one of the component parts to re-order.

21. The method of claim 20 wherein the interactive schematic comprises a plurality of reference identifiers associated with the component parts and wherein the consumer selects one of die component parts by selecting one of the reference identifiers within the schematic.

\* \* \* \* \*